United States Patent [19]
Reed et al.

[11] Patent Number: 5,582,150
[45] Date of Patent: Dec. 10, 1996

[54] LEAN AIR/FUEL CONTROL SYSTEM FOR AN INTERNAL COMBUSTION ENGINE

[75] Inventors: Dennis C. Reed, Plymouth; Douglas R. Hamburg, Bloomfield Hills; Nicholas G. Zorka, Clarkston, all of Mich.

[73] Assignee: Ford Motor Company, Dearborn, Mich.

[21] Appl. No.: 596,855

[22] Filed: Feb. 5, 1996

[51] Int. Cl.$^6$ .................................................. F02P 5/14
[52] U.S. Cl. .................................................. 123/421
[58] Field of Search ............................ 123/421, 686, 123/418, 424, 425, 417, 416, 478; 60/284, 285, 274

[56] References Cited

U.S. PATENT DOCUMENTS

| | | | |
|---|---|---|---|
| 3,964,443 | 6/1976 | Hartford | 123/421 |
| 3,978,833 | 9/1976 | Crall et al. | 123/421 |
| 4,111,010 | 9/1978 | Minami | 60/276 |
| 4,367,711 | 1/1983 | Ikeura | 123/417 |
| 4,378,769 | 4/1983 | Haubner et al. | 123/416 |
| 4,416,239 | 11/1983 | Takase et al. | 123/478 |
| 4,458,646 | 7/1984 | Suzuki et al. | 123/425 |
| 5,027,771 | 7/1991 | Daikoku et al. | 123/421 |
| 5,211,011 | 5/1993 | Nishikawa et al. | 60/284 |
| 5,483,946 | 1/1996 | Hamburg et al. | 123/606 |
| 5,515,826 | 5/1996 | Hamburg et al. | 123/421 |

*Primary Examiner*—Raymond A. Nelli
*Attorney, Agent, or Firm*—Allan J. Lippa

[57] ABSTRACT

An air/fuel control system for an engine (10) provides an air/fuel indicating signal linearly related to average engine air/fuel operation from a two-state exhaust gas oxygen sensor (76). Fuel delivered to the engine is modulated with a periodic or modulation signal (244). The modulation signal is offset in either a fuel increasing or a fuel decreasing direction when the air/fuel indicating signal is respectively saturated at either a lean or a rich value (394–420).

12 Claims, 7 Drawing Sheets

LEAN AIR/FUEL CONTROL SYSTEM FOR AN INTERNAL COMBUSTION ENGINE

BACKGROUND OF THE INVENTION

The field of the invention relates to engine air/fuel control systems including systems which rapidly warm the catalytic converter.

U.S. Pat. No. 5,211,011 discloses a system in which the fuel delivered to an engine is alternated between rich and lean values while ignition timing is retarded to more rapidly heat the catalytic converter.

The inventors herein have recognized numerous problems with the above approach. For example, fuel modulation, under certain operating conditions, may cause an excessively lean shift in engine air/fuel ratio resulting in rough engine operation. Still another problem recognized by the inventors is that the air/fuel ratio may drift lean and cause misfires, or may drift rich causing excessive emissions.

SUMMARY OF THE INVENTION

An object of the invention claimed herein is to provide rapid warm-up of the catalytic converter using fuel modulation without incurring excessively lean or rich operation The problems of prior approaches are overcome, and the objects and advantages of the claimed invention achieved, by providing both a control method and a control system for an engine having an exhaust gas oxygen sensor and a catalytic converter positioned in the engine exhaust. In one particular aspect of the invention, the method comprises the steps of: modulating fuel delivered to the engine by a modulation signal; generating an indicating signal from the exhaust gas oxygen sensor output; and offsetting the modulation signal by a first predetermined offset in a fuel increasing direction when the indicating signal reaches a first preselected value and offsetting the modulation signal by a second predetermined offset in a fuel decreasing direction when the air/fuel indicating signal reaches a second preselected value.

An advantage of the above aspect of the invention is that rapid warm-up of the catalytic converter is provided without incurring excessively lean or excessively rich engine air/fuel operation.

In another aspect of the invention, the system comprises: an exhaust gas oxygen sensor with a two state output having first and second states respectively corresponding to exhaust gases being rich or lean of stoichiometry; a fuel controller delivering fuel to the engine in response to a desired fuel signal from an engine controller; the engine controller modulating the desired fuel signal with a modulation signal and averaging an output of the exhaust gas oxygen sensor to provide an air/fuel indicating signal having an amplitude related to engine air/fuel operation; and the engine controller offsetting the modulation signal by a first predetermined offset in a fuel increasing direction when the air/fuel indicating signal reaches a first preselected limit and offsetting the modulation signal by a second predetermined offset in a fuel decreasing direction when the air/fuel indicating signal reaches a second preselected limit. Preferably, the controller generates the modulation frequency with a first predetermined frequency until a first value corresponding to the preselected exhaust gas temperature is reached and thereafter generates the modulation signal at a second predetermined frequency which is less than the first frequency.

An advantage of the above aspect of the invention is that rapid warm-up of the catalytic converter is provided without incurring excessively lean or excessively rich engine air/fuel operation.

Another advantage of the aspect of the above invention is that drift in air/fuel operation is avoided thereby avoiding excessively lean or excessively rich air/fuel operation.

BRIEF DESCRIPTION OF THE DRAWINGS

The object and advantages of the claimed invention will become more readily apparent from the following detailed example of operation described with lid reference to the drawings wherein:

DESCRIPTION OF AN EXAMPLE OF OPERATION

Figure 1:
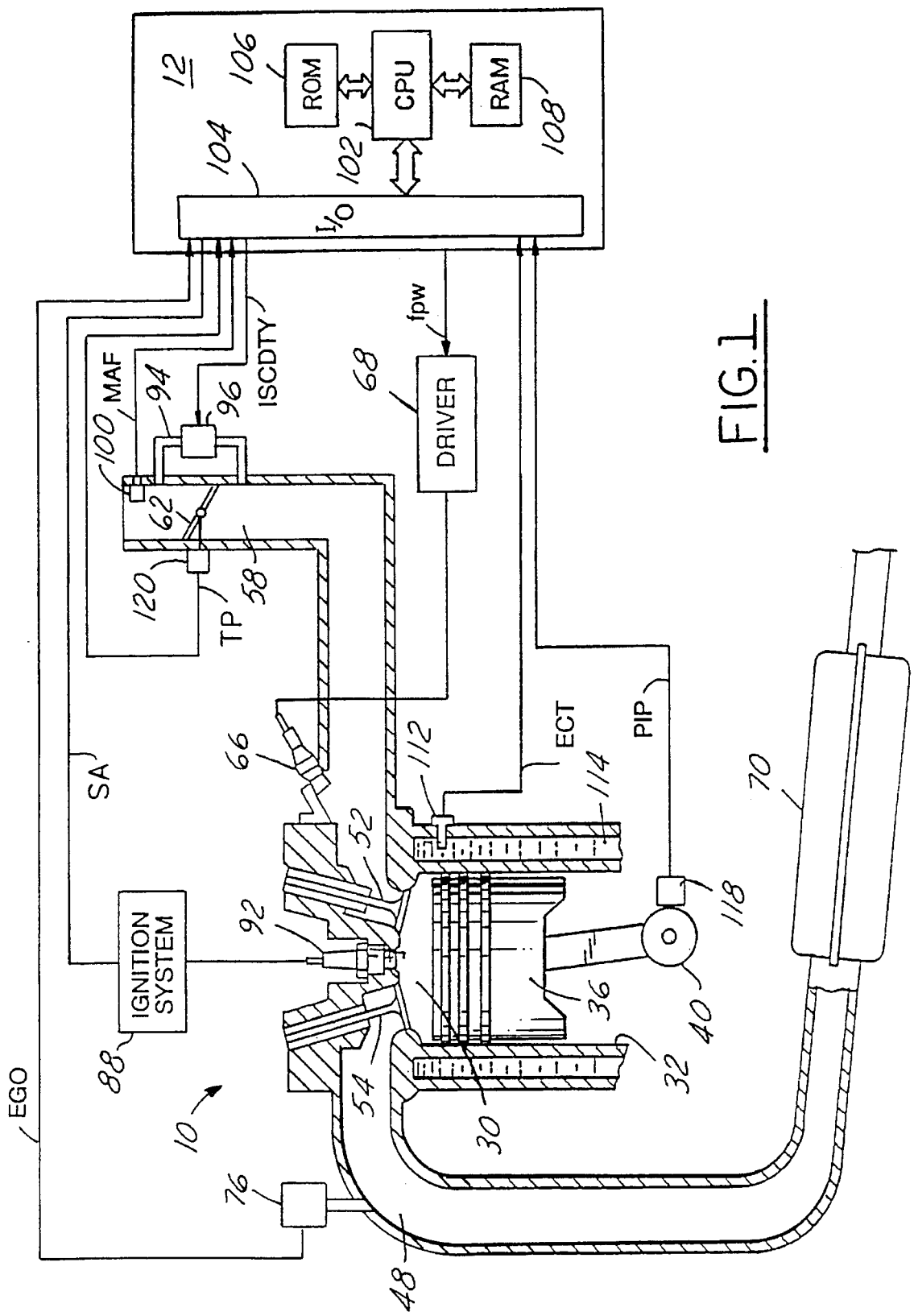
FIG. 1 is a block diagram of an embodiment in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal fpw received from controller 12 via conventional electronic driver 68. Fuel is delivered to fuel injector 66 by a conventional fuel system (not shown) including a fuel tank, fuel pump, and fuel rail.

Exhaust gas oxygen sensor 76 is shown coupled to exhaust manifold 48 upstream of catalytic converter 70. In this particular example, sensor 76 provides signal EGO to controller 12 which converts signal EGO into two-state signal EGOS. A high voltage state of signal EGOS indicates exhaust gases are rich of a desired air/fuel ratio and a low voltage state of signal EGOS indicates exhaust gases are lean of the desired air/fuel ratio. Typically, the desired air/fuel ratio is selected at stoichiometry which falls within the peak efficiency window of catalytic converter 70.

Idle bypass passageway 94 is shown coupled to throttle body 58 in parallel with throttle plate 66 to provide air to intake manifold 44 via solenoid valve 96 independently of the position of throttle plate 62. Controller 12 provides pulse width modulated signal ISCDTY to solenoid valve 96 so that airflow is inducted into intake manifold 44 at a rate proportional to the duty cycle of signal ISCDTY for controlling engine idle speed.

Conventional distributorless ignition system 88 provides ignition spark to combustion chamber 30 via spark plug 92 in response to spark advance signal SA from controller 12.

Controller 12 is shown in FIG. 1 as a conventional microcomputer including: microprocessor unit 102, input/output ports 104, an electronic storage medium for executable programs and calibration values shown as read only memory chip 106 in this particular example, random access memory 108, and a conventional data bus. Controller 12 is shown receiving various signals from sensors coupled to engine 10, in addition to those signals previously discussed, including: measurements of inducted mass air flow (MAF) from mass air flow sensor 100 which is coupled to throttle body 58 upstream of air bypass passageway 94 to provide a total measurement of airflow inducted into intake manifold 44 via both throttle body 58 and air bypass passageway 94; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120.

Figure 2A:
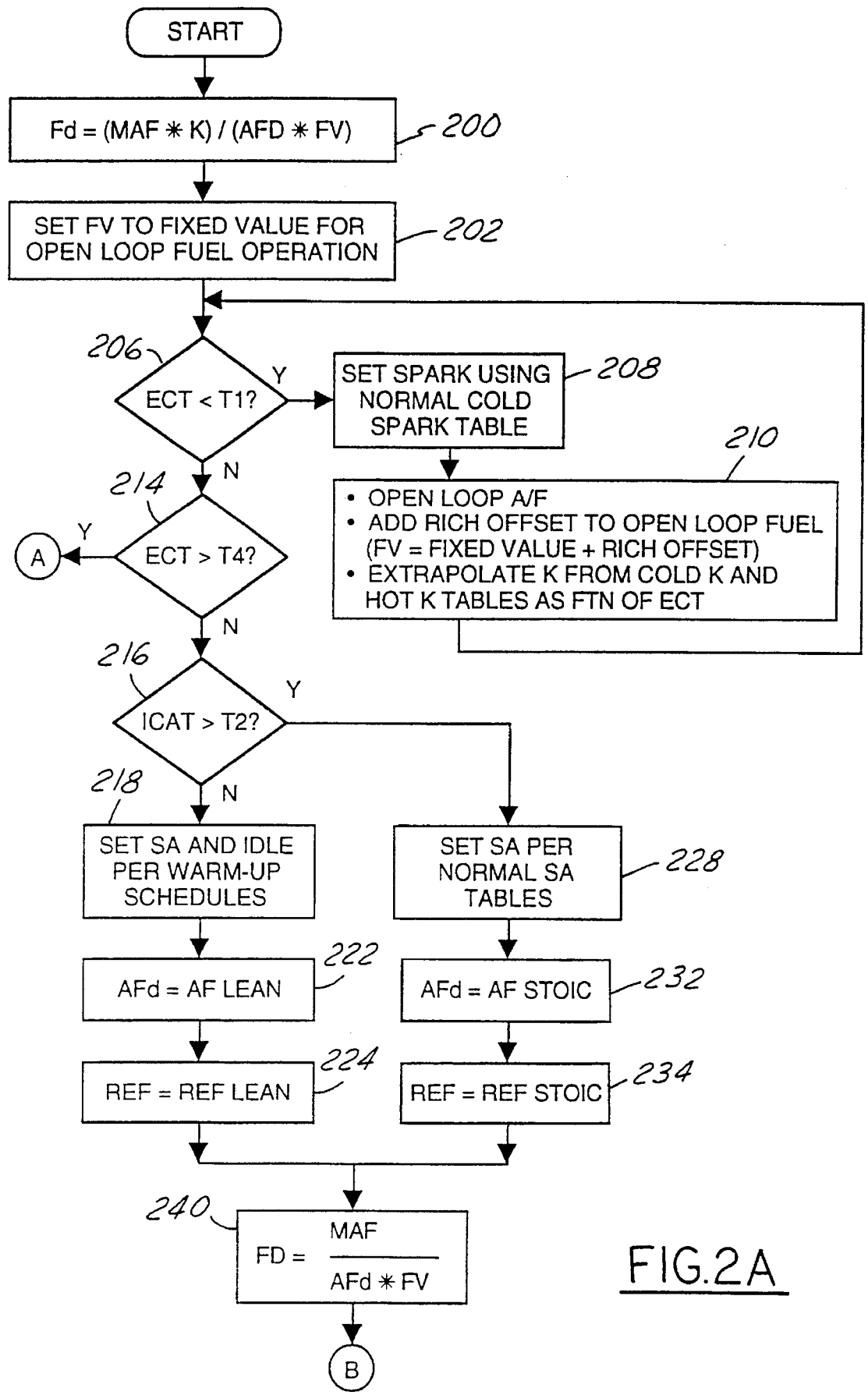
FIGS. 2A–2B are flow charts of various operations performed by portions of the embodiment shown in FIG. 1.
Figure 2B:
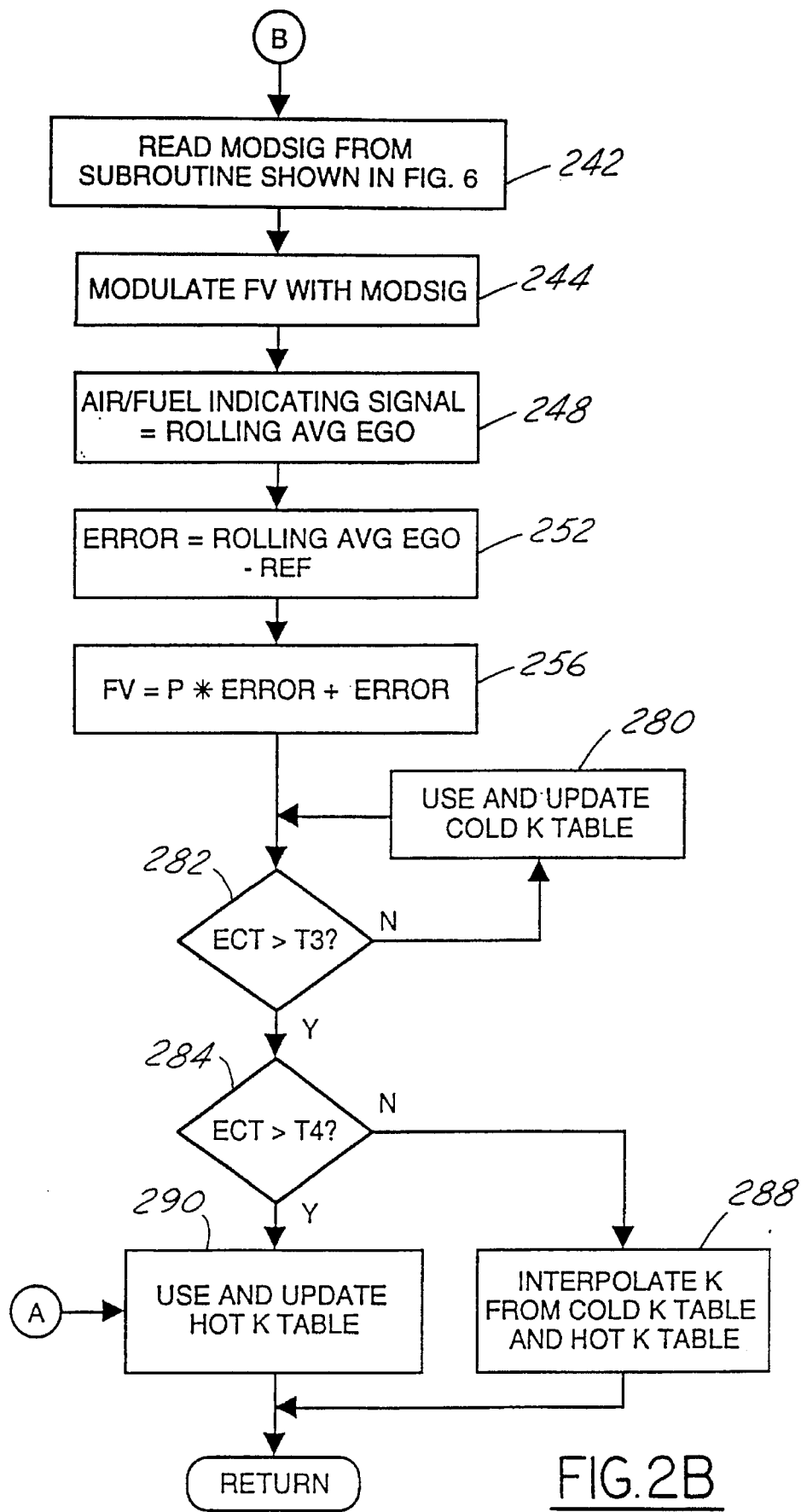

A description of various air/fuel operations performed by controller 12 is now provided with initial reference to the flow charts shown in FIGS. 2A–2B. During step 200, the fuel command (shown as desired fuel quantity Fd) is calculated by dividing the product of desired air/fuel ratio AFD times feedback variable FV into the product of inducted mass flow measurement MAF times correction value K. In this particular example, desired air/fuel ratio AFD is the stoichiometric value of the fuel blend used which is 14.3 pounds of air per pound of fuel for a low emissions fuel blend. Feedback variable FV and correction value K are each generated by the feedback routines, responsive to EGO sensor 76, which are described later herein with particular reference to respective FIGS. 2B and 5.

Continuing with FIG. 2A, feedback variable FV is initially set to a fixed value for open loop air/fuel operation (step 202). Stated another way, desired fuel quantity Fd provides an open loop fuel command which is related to signal MAF and is not adjusted by feedback. In this particular example, feedback variable FV is set to unity which would correspond to operation at desired air/fuel ratio AFD under ideal operating conditions without any engine component aging. It is well known, however, that this open loop operation may not result in engine air/fuel exactly at stoichiometry. Correction by correction value K, however, will be provided as described below.

When engine coolant temperature ECT is less than predetermined temperature T1 (step 206), engine temperature is too low to enter the subroutine for converter warm-up. The subroutine described with reference to steps 208–210 is then entered to minimize the time required to start and reliably warm-up engine 10. In step 208, ignition timing is first set using the cold start table stored in ROM 10. Various sub steps are then performed during step 210. Open loop air/fuel operation proceeds by adding a rich offset to desired fuel quantity Fd. In this particular example, feedback variable FV is set to a fixed value less than unity. Correction value K is then extrapolated from two tables stored in ROM 10 which store correction K for cold engine operation and hot engine operation, respectively. In this example, the extrapolation occurs as a function of engine coolant temperature ECT.

In the event engine coolant temperature ECT is greater than temperature T1 (step 206), it is compared to temperature T4 (step 214) which is associated with hot engine operation and normal air/fuel ratio control. If engine coolant temperature CT is less than temperature T4, an inference of the temperature of catalytic converter 70 (ICAT) is compared to temperature T2 (step 216).

When inferred temperature ICAT is less than temperature T2, ignition timing and engine idle speed are set per the warm-up schedules (step 218) provided for rapid catalyst warm-up. That is, ignition timing is retarded from its nominal value and idle speed elevated. Desired engine air/fuel ratio AFd is set to a lean value (AFLEAN) which is lean of stoichiometry by a preselected amount as shown in step 222. In this particular example, stoichiometry is 14.3 pounds of air per pound of fuel and AFLEAN is 14.6 pounds of air per pound of fuel. During step 224, reference signal REF is see equal to lean value REFLEAN which corresponds to desired lean air/fuel ratio AFLEAN.

On the other hand, if inferred temperature ICAT is greater than temperature T2, normal ignition timing and idle speed tables are utilized (step 228). Desired air/fuel ratio APd is then set equal to the air/fuel ratio corresponding to stoichiometry (AFSTOIC) as shown in step 232. During step 234, reference signal REF is set equal to a value corresponding to the stoichiometric air/fuel ratio (REFSTOIC).

Desired fuel quantity Fd is generated during step 240 which corresponds to the amount of liquid fuel to be delivered to engine 10. More specifically, desired fuel quantity signal Pd is generated by dividing the product of desired air/fuel ratio AFd and feedback variable FV into measurement of inducted mass air flow MAF times a correction value (not shown). Feedback variable FV is modulated during step 244 by modulation signal MODSIG which is read from the subroutine described later herein with particular reference to FIG. 6.

A rolling average of signal EGO is generated during step 248. Error signal ERROR is generated during step 252 by subtracting reference signal REF from the rolling average of signal EGO (252). The feedback variable FV is then generated by applying a proportional plus integral (PI) controller to signal ERROR as shown in step 256. More specifically, signal ERROR is multiplied by proportional gain value P and the product added to the integral of signal ERROR.

Figure 3A:
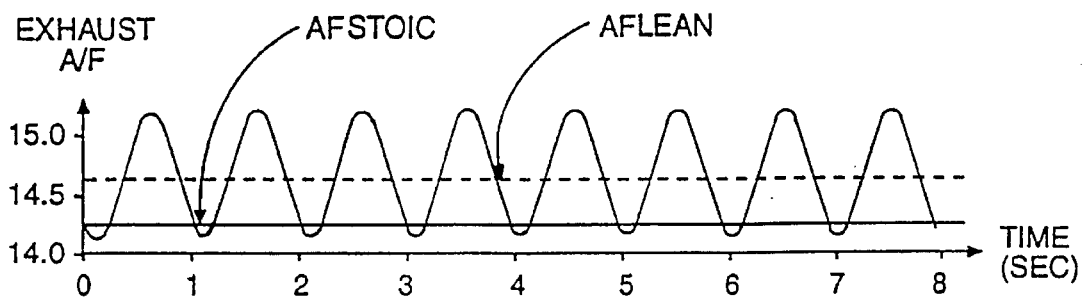
FIGS. 3A–3C illustrate various electrical waveforms corresponding to various operations performed by the embodiment shown in FIG. 1 with particular reference to the operation described with particular reference to FIGS. 2A–2B.
Figure 3B:
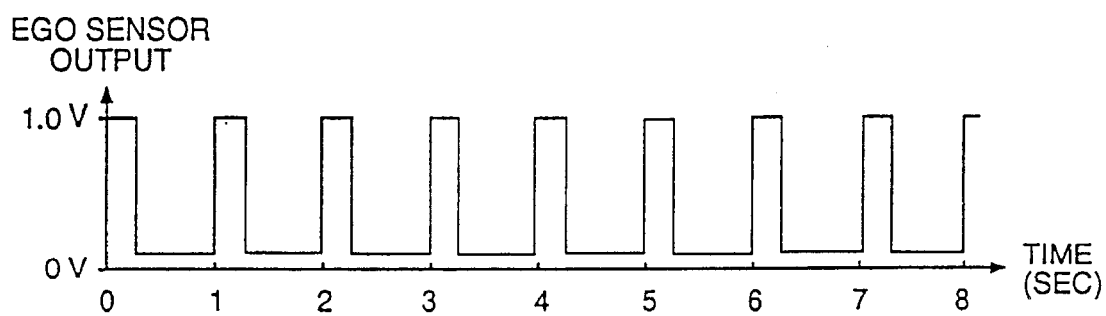
Figure 3C:
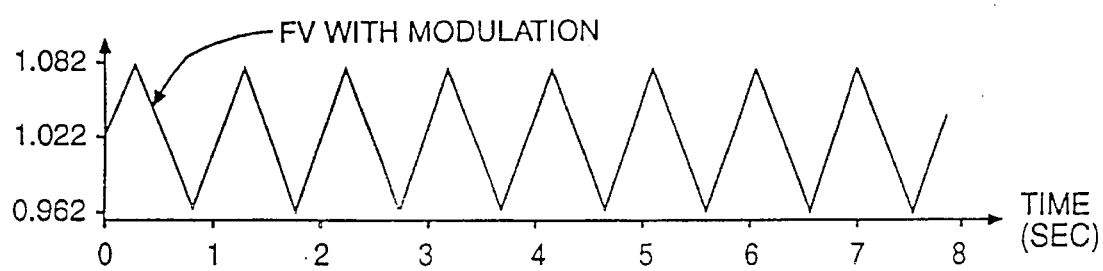

The operation and advantageous effects of steps 222–256 will be better understood by reviewing an example of operation with particular reference to the waveforms shown in FIGS. 3A–3C. Before discussing FIGS. 3A–3C, the description of updating the cold K and hot K tables is completed with continuing reference to FIG. 2B.

When engine coolant temperature ECT is greater than temperature T3 (step 282), but less than temperature T4 (step 284), each correction value K is interpolated from the cold K and hot K tables stored in ROM 10 for each engine speed load range (step 288). In the event engine coolant temperature ECT is greater than temperature T4 (step 284), each correction value K is selected from the hot K tables of ROM 10 (step 290).

Figure 5:
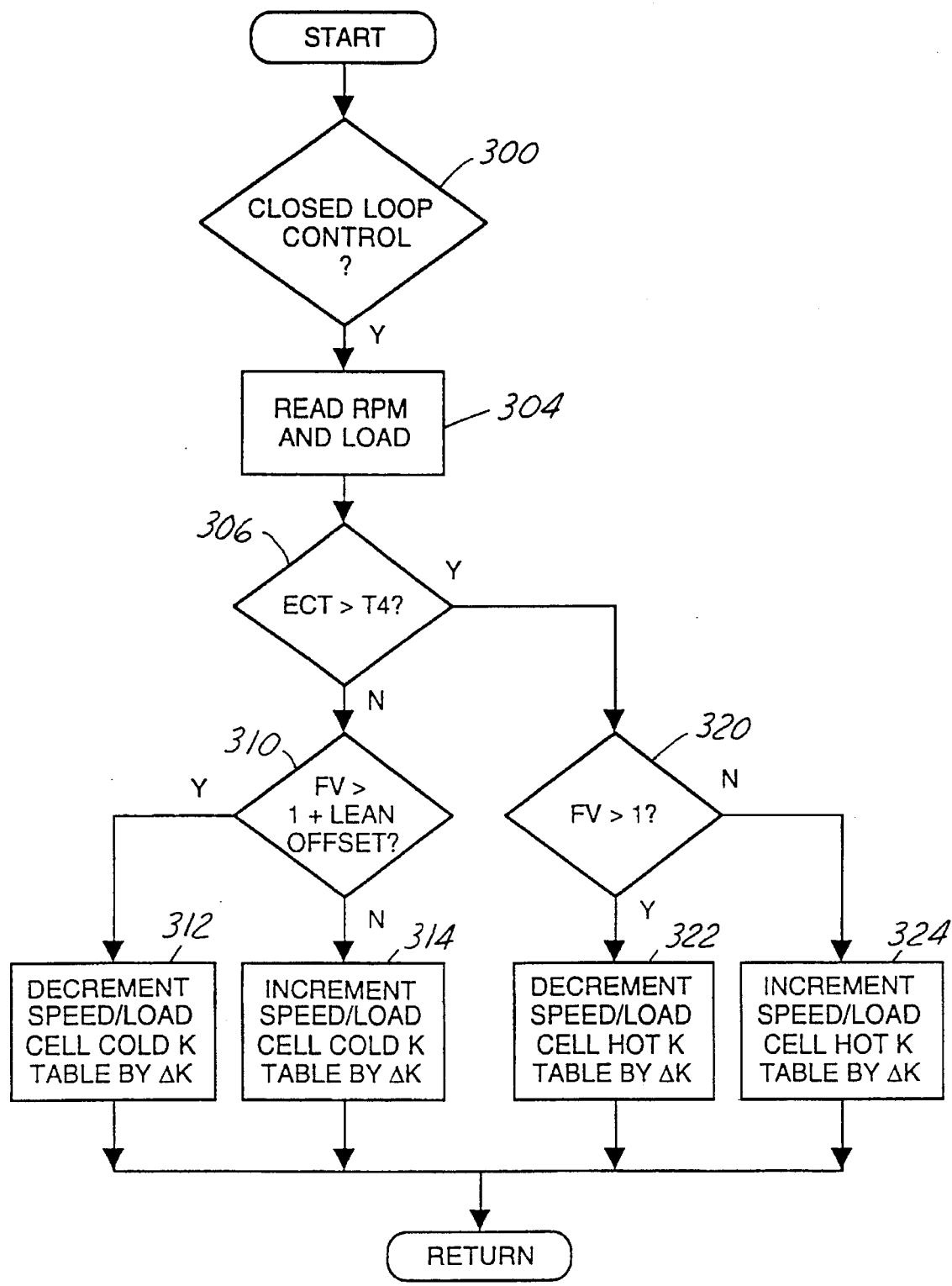
FIGS. 5 and 6 are flow charts of various operations performed by portions of the embodiment shown in FIG. 1.

It is noted that correction values K for the hot K table are generated by adaptive learning as described later herein with particular reference to FIG. 5. By generating two sets of correction values (K) for cold and hot engine operation, and either extrapolating (step 210) or interpolating (step 288) between the tables, more accurate air/fuel operation is obtained. Once again, engine air/fuel operation is provided at either stoichiometry or preselected air/fuel ratios lean of stoichiometry by a preselected amount far more accurately than heretofore possible.

Referring now to FIGS. 3A–3C and FIG. 4, graphical representations are shown which correspond to process steps 222–256 which were previously described with particular reference to FIGS. 2A–2B. In this particular example which depicts steady state lean air/fuel operation, reference signal REF is set to lean value REFLEAN to provide an average air/fuel ratio lean of stoichiometry while feedback variable FV is being modulated with a triangular wave (FIG. 3C). Such modulation occurs until an indication is provided that catalytic converter 70 has reached a desired temperature.

Figure 4:
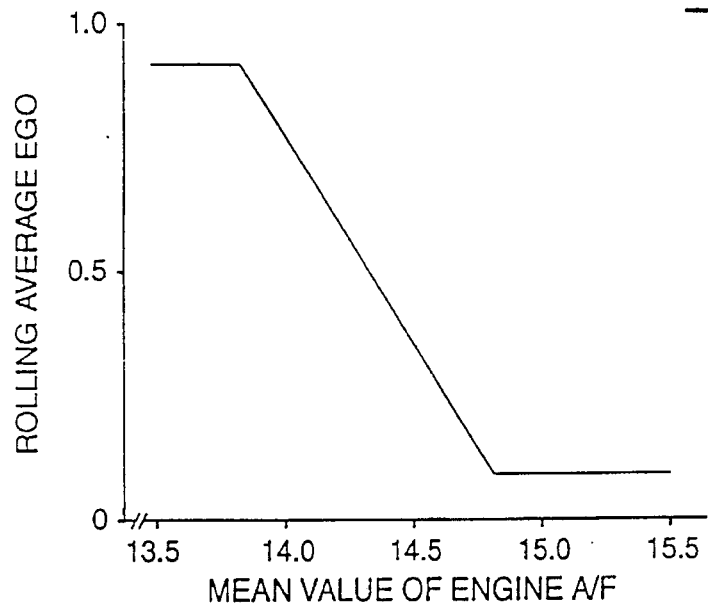
FIG. 4 is a graphical representation showing how the rolling average of signal EGO provides an average air/fuel indicating signal.

In this particular example, the effect of such modulation and selection of lean reference value REFLEAN provides the exhaust air/fuel ratio shown in FIG. 3A. The average value of this air/fuel ratio is shown as the dashed line labeled AFLEAN which is lean of the stoichiometric air/fuel ratio labeled AFSTOIC. Corresponding signal EGO from sensor 76 is shown in FIG. 3B wherein a high voltage state is indicative of air/fuel operation rich of stoichiometry and a low voltage state is indicative of air/fuel operation lean of stoichiometry. The rolling average of signal EGO is the air/fuel indicating signal (FIG. 4). In this example showing steady state operation, the rolling average of signal EGO is forced to the same value as lean reference value REFLEAN.

Referring to FIG. 4, a hypothetical graphical representation of the rolling average of signal EGO, which is the lean air/fuel indicating signal, in relation to the average engine air/fuel ratio is shown. It is seen that an advantage of the invention claimed herein is that a linear air/fuel indicating signal is provided from a two-state exhaust gas oxygen sensor. In this particular example, the air/fuel indicating signal is used to operate engine 10 at an average value lean of stoichiometry using accurate feedback control.

The adaptive learning subroutine for learning correction value K during both cold engine and hot engine operation is now described with reference to the flowchart shown in FIG. 5. Operation for entering closed loop air/fuel control is first determined in step 300 as soon as EGO Sensor 76 reaches its operating temperature and engine coolant temperature ECT is not less than T1 in step 206 in FIGS. 2A–2B. Engine speed and load are then read during step 304 and the correction values generated below stored in tables for each speed load range.

When engine coolant temperature ECT is less than temperature T4 (step 306) and also less than T3, the cold K tables are updated as now described. If feedback variable FV is greater than its nominal value (unity in this example) plus the lean offset introduced as previously described with reference to FIGS. 2A–2B (step 310), then the cold K table speed/load cell is decremented by ΔK (step 312). On the other hand, if feedback variable FV is less than unity plus the lean offset (step 310), the corresponding speed/load cell in the cold K table incremented by ΔK (step 314).

Operation proceeds in a similar manner to adaptively learn correction value K during hot engine operation when engine coolant temperature ECT is greater than temperature T4 (step 306). More specifically, when feedback variable FV is greater than unity (step 320), the speed/load cell of the hot K table is decremented by ΔK (step 322). Similarly, when feedback variable FV is less than unity (step 320), the speed/load cell of the hot K table is incremented by ΔK (step 324).

The subroutine described above with respect to FIG. 5 provides an adaptive learning of the difference or error between actual engine air/fuel operation and the desired air/fuel ratio. It is also operable when the desired air/fuel ratio is offset from stoichiometry by a preselected offset.

Figure 6:
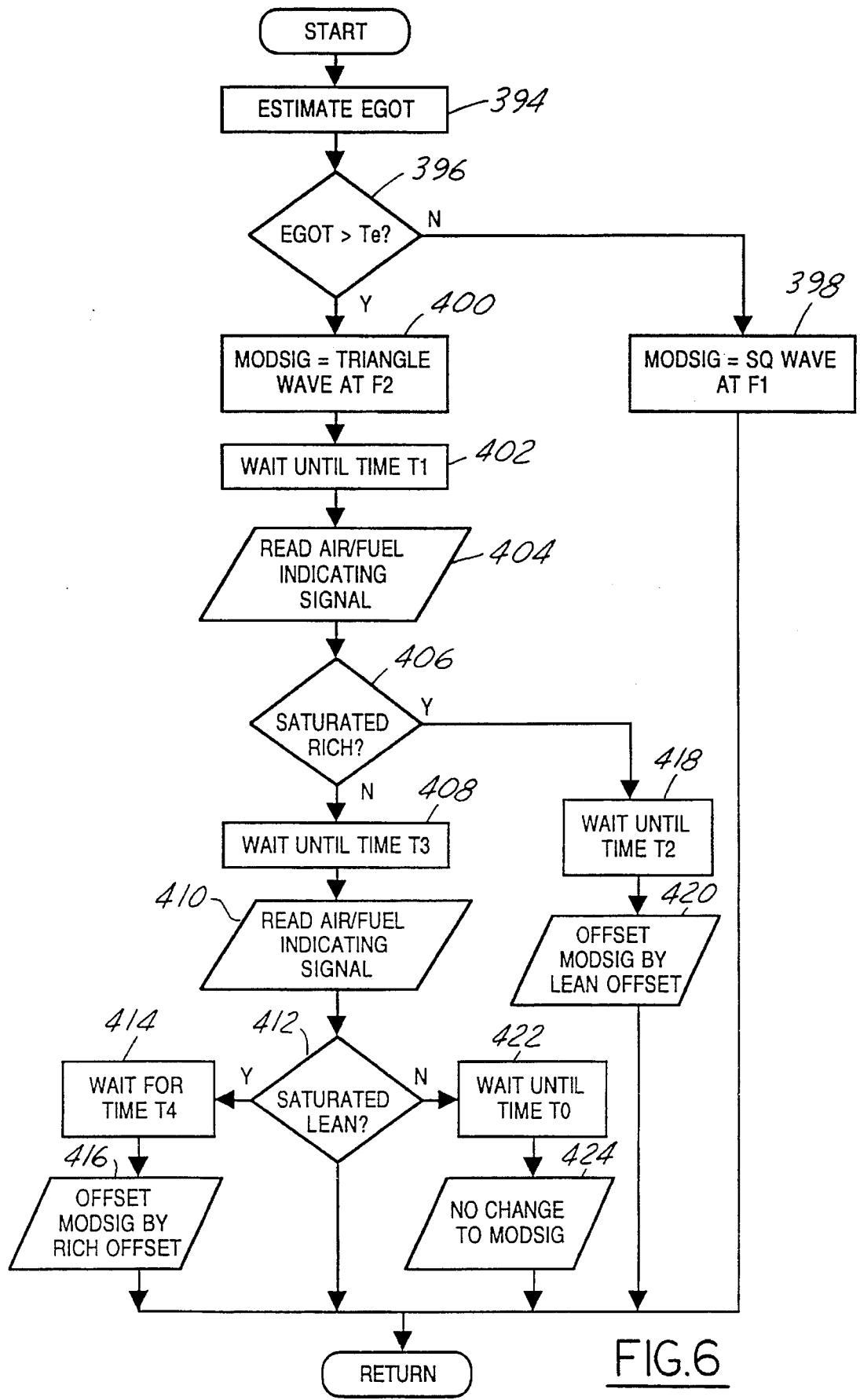
Figure 7A:
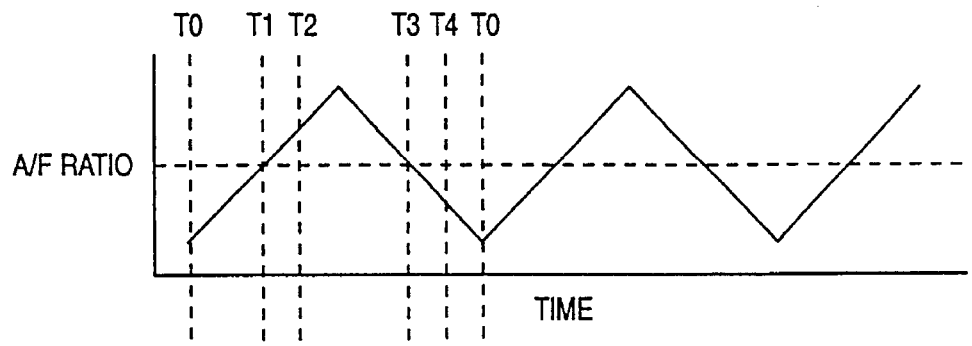
FIGS. 7A–7C illustrate various modulation signals associated with the operation described with particular reference to FIG. 6.
Figure 7B:
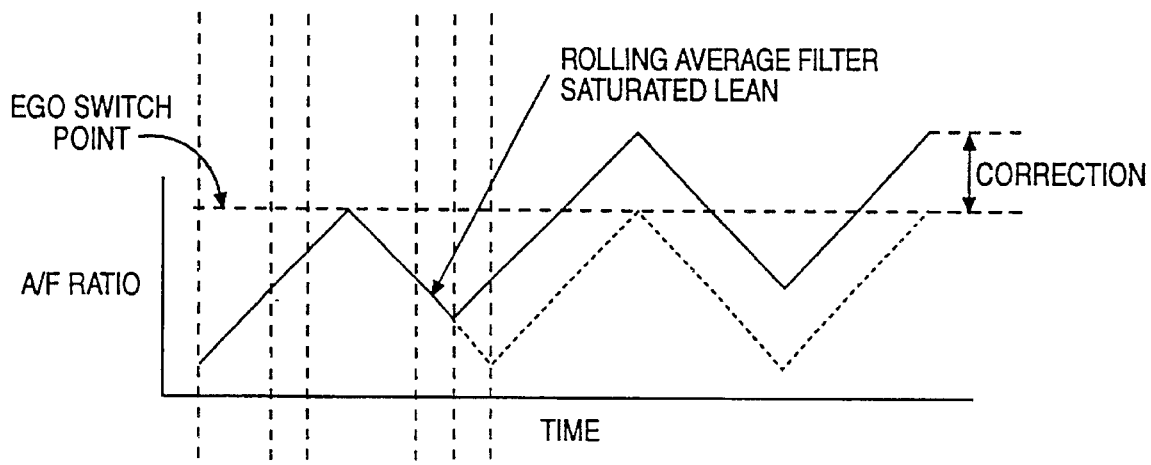
Figure 7C:
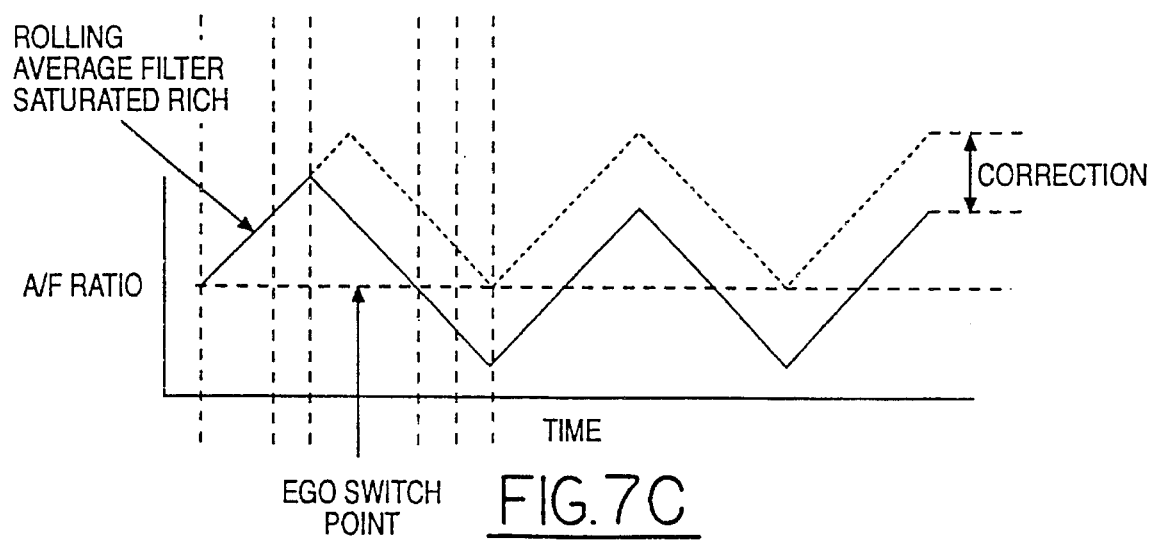

Concurrently referring to the flowchart shown in FIG. 6 and the corresponding signals shown in FIGS. 7A–7C, the subroutine for generating modulation signal MODSIG is now described. Periodic or modulation signal MODSIG is used to modulate fuel delivered to the engine as previously described with particular reference to FIGS. 2A–2B.

The temperature of exhaust gas oxygen sensor 76 (EGOT) is first estimated in step 394. In this particular example, the estimate is provided by measuring the peak-to-peak excursion of signal EGO. It is well-known that the peak-to-peak excursion in the output of an exhaust gas oxygen sensor is related to temperature.

When estimated temperature EGOT is less than a temperature associated with warm and therefore stable operation of sensor 76 (temperature Te) as shown in step 396, modulation signal MODSIG is generated as a square wave at frequency F1 (step 398). In this particular example, frequency F1 is on the order of 4 hertz which is considerably greater than the modulation frequency desired for normal operation. Using square wave modulation at such a frequency was found to provide well-mixed exhaust gas having relatively high concentrations of both CO and $O_2$. Rapid warm-up of catalytic converter 70 is thereby provided when combined with the ignition timing retard strategy and fuel enleanment previously described herein with reference to FIGS. 2A–2B.

When estimated temperature EGOT is greater than preselected temperature Te (step 396), modulation signal MODSIG is generated as a triangular wave with frequency F2 (step 400). In this particular example, frequency F2 is in the range of 1–2 hertz which has been found to be suitable for accurate engine air/fuel control.

After delay time T1 (step 402), the AIR/FUEL INDICATING SIGNAL is read during step 404. If the AIR/FUEL INDICATING SIGNAL is saturated rich (step 406), modulation signal MODSIG is shifted or offset a preselected lean offset (step 420), after delay time T2 (step 418). This lean offset of modulation signal MODSIG is shown graphically in FIG. 7C.

When the AIR/FUEL INDICATING SIGNAL is not detected as being saturated rich during step 406, it is read again during step 410 after delay time T3 (step 408). If the AIR/FUEL INDICATING SIGNAL is then detected as being saturated lean (step 412), modulation signal MODSIG is offset by a preselected rich offset (step 416) after delay time T4 (step 414). This rich offset is shown graphically in FIG. 7B at time T4.

On the other hand, if the AIR/FUEL INDICATING SIGNAL is not saturated lean (step 412), no offset is provided to modulation signal MODSIG (step 424). Modulation signal MODSIG without such an offset is shown in FIG. 7A.

Although one example of an embodiment which practices the invention has been described herein, there are numerous other examples which could also be described. For example, analog devices, or discreet IC's may be used to advantage rather than a microcomputer. Further, different feedback controllers other than proportional plus integral may be used to advantage. The invention is therefore to be defined only in accordance with the following claims.

What is claimed:

1. A control method for an engine having an exhaust gas oxygen sensor and a catalytic converter positioned in the engine exhaust, comprising the steps of:

modulating fuel delivered to the engine by a modulation signal;

generating an indicating signal from the exhaust gas oxygen sensor output; and offsetting said modulation signal by a first predetermined offset in a fuel increasing direction when said indicating signal reaches a first preselected value and offsetting said modulation signal by a second predetermined offset in a fuel decreasing direction when said air/fuel indicating signal reaches a second preselected value.

2. The method recited in claim 1 wherein said modulation signal is generated with a first predetermined frequency until a first value corresponding to a preselected exhaust gas temperature is reached and thereafter generating said modulation signal at a second predetermined frequency which is less than said first frequency.

3. The method recited in claim 1 wherein said step of generating said indicating signal comprises the step of averaging an output of the exhaust gas oxygen sensor to provide said indicating signal with an amplitude related to engine air/fuel operating ratio.

4. The method recited in claim 3 further comprising a step of correcting said modulated fuel delivered to the engine with a feedback variable derived from said air/fuel indicating signal so that engine air/fuel operation averages at a desired air/fuel ratio.

5. The method recited in claim 4 further comprising the steps of selecting a reference value corresponding to a desired air/fuel ratio, generating an error signal from a difference between said indicating signal and said reference value, and generating said feedback variable from said error signal.

6. The method recited in claim 5 wherein said step of averaging comprises a rolling average of the sensor output.

7. The method recited in claim 6 wherein said sensor output is a two state output having first and second states respectively corresponding to exhaust gases being rich or lean of stoichiometry.

8. A control system for an engine, comprising:

an exhaust gas oxygen sensor with a two state output having first and second states respectively corresponding to exhaust gases being rich or lean of stoichiometry;

a fuel controller delivering fuel to the engine in response to a desired fuel signal from an engine controller;

said engine controller modulating said desired fuel signal with a modulation signal and averaging an output of the exhaust gas oxygen sensor to provide an air/fuel indicating signal having an amplitude related to engine air/fuel operation; and said engine controller offsetting said modulation signal by a first predetermined offset in a fuel increasing direction when said air/fuel indicating signal reaches a first preselected limit and offsetting said modulation signal by a second predetermined offset in a fuel decreasing direction when said air/fuel indicating signal reaches a second preselected limit.

9. The control system recited in claim 8 further comprising an ignition controller for providing engine ignition timing retarded from a nominal value during cold engine operation to increase exhaust gas temperature during said cold engine operation to increase exhaust gas temperature.

10. The system recited in claim 9 wherein said controller generates said modulation signal with a first predetermined frequency until a first value corresponding to a preselected exhaust gas temperature is reached and thereafter generates said modulation signal at a second predetermined frequency which is less than said first frequency.

11. An article of manufacture, comprising:

a computer storage medium having a computer program encoded therein for causing an engine control computer to control an engine having its exhaust coupled to an exhaust gas oxygen sensor with a two state output having first and second states respectively corresponding to exhaust gases being rich or lean of stoichiometry and the engine receiving fuel from a fuel controller in response to a desired fuel signal, said computer storage medium comprising:

modulating code means for modulating said desired fuel signal with a modulation signal and averaging an output of the exhaust gas oxygen sensor to provide an air/fuel indicating signal having an amplitude related to engine air/fuel operation; and modulating offset code means for offsetting said modulation signal by a first predetermined offset in a fuel increasing direction when said air/fuel indicating signal reaches a first preselected limit and offsetting said modulation signal by a second predetermined offset in a fuel decreasing direction when said air/fuel indicating signal reaches a second preselected limit.

12. The article of manufacture recited in claim 11 wherein said computer storage medium comprises an electronically programmable chip.

* * * * *